(12) United States Patent
Shen et al.

(10) Patent No.: US 7,295,614 B1
(45) Date of Patent: Nov. 13, 2007

(54) METHODS AND APPARATUS FOR ENCODING A VIDEO SIGNAL

(75) Inventors: Jiandong Shen, Santa Clara, CA (US); Wai-Yip Chan, Kingston (CA)

(73) Assignee: Cisco Technology, Inc., San Jose, CA (US)

( * ) Notice: Subject to any disclaimer, the term of this patent is extended or adjusted under 35 U.S.C. 154(b) by 1156 days.

(21) Appl. No.: 09/945,116

(22) Filed: Aug. 31, 2001

Related U.S. Application Data

(60) Provisional application No. 60/231,085, filed on Sep. 8, 2000.

(51) Int. Cl.
*H04N 7/12* (2006.01)

(52) U.S. Cl. .................................. 375/240.25

(58) Field of Classification Search ............... 348/405, 348/408, 407, 415, 401, 397, 398, 423, 409, 348/402, 422, 412, 413, 414, 416, 400, 417; 375/240, 240.16, 240.15, 240.18, 240.25, 375/240.12, 240.2, 240.24, 240.22; 382/238, 382/239, 173, 253, 240, 251, 270, 236, 232, 382/235; 340/401, 397, 398, 423, 409, 408, 340/407, 415, 402, 422, 405

See application file for complete search history.

(56) References Cited

U.S. PATENT DOCUMENTS

| | | | |
|---|---|---|---|
| 4,218,704 A | | 8/1980 | Netravali et al. |
| 4,472,832 A | | 9/1984 | Atal et al. |
| 5,453,986 A | * | 9/1995 | Davis et al. ............... 370/259 |
| 5,818,536 A | * | 10/1998 | Morris et al. ............... 348/416 |
| 5,826,225 A | * | 10/1998 | Hartung et al. ............. 704/222 |
| 5,912,706 A | * | 6/1999 | Kikuchi et al. ......... 375/240.13 |
| 6,091,775 A | * | 7/2000 | Hibi et al. .................. 375/240 |
| 6,148,107 A | * | 11/2000 | Ducloux et al. ............ 382/236 |
| 6,636,220 B1 | * | 10/2003 | Szeliski et al. ............. 345/475 |
| 2004/0071358 A1 | * | 4/2004 | Xin et al. ................... 382/253 |
| 2005/0207500 A1 | * | 9/2005 | Bober .................... 375/240.22 |

OTHER PUBLICATIONS

S. Aïssa and E. Dubois, "*2-D-CELP Image Coding with Block-Adaptive Prediction and Variable Code-Vector Size*", IEEE Trans. On Image Processing, vol. 5, No. 2, Feb. 1996.

(Continued)

*Primary Examiner*—Tung Vo
*Assistant Examiner*—Behrooz Senfi
(74) *Attorney, Agent, or Firm*—Beyer Weaver LLP

(57) ABSTRACT

The present invention relates to systems and methods for compressing, decompressing, and transmitting video data. The systems and methods include pixel by pixel motion estimation and compensation and efficient quantization of residual errors. The present invention applies block estimation of the residual error produced by motion compensation. The block estimation is applied by a local decoder to generate synthesized blocks of video data. The block estimation approximated uses a set of predetermined motion estimation errors that are stored as error vectors in a codebook. The codebook is included in an encoder of the present invention and converts an error vector for each block to an error vector index. The error vector index, which introduces minimal transmission burden, is then sent from the encoder to a target decoder. A receiving decoder also includes a copy of the codebook and converts the error vector index to its associated error vector for reconstruction of video data.

39 Claims, 9 Drawing Sheets

OTHER PUBLICATIONS

G. Bjontegaard, "*H.26L Test Model Long Term No. 1 (TML-1) draft1*", ITU-T SG16/Q15 document Q15-H-36d1, Aug. 1999, (downloadable via ftp://standard.pictel.com/video-site.), date printed: Dec. 8, 2000.

M. Foodeei and E. Dubois, "*Coding Image Sequence Intensities Along Motion Trajectories Using EC-CELP Quantization*", Proc. IEEE Intl. Conf. Image Processing, Nov. 1994.

A. Gersho and R.M. Gray, "*Vector Quantization and Signal Compression*", Norwell, MA: Kluwer 1992, Chapter 13, Predictive Vector Quantization, pp. 487-517.

A. Gersho and R.M. Gray, "*Vector Quantization and Signal Compression*", Norwell, MA: Kluwer 1992, Chapter 16, Adaptive Vector Quantization, pp. 587-629.

W.B. Kleijn and K.K. Paliwal, "*Speech Coding and Synthesis*", Elsevier, 1995, Chapter 3, Linear-Prediction based Analysis-by-Synthesis Coding, pp. 79-119.

A.N. Netravali and J.D. Robbins, "*Motion Compensated Television Coding: Part-1*", Bell Syst. Tech. J., vol. 58, pp. 631-670, Mar. 1979.

K. Rose, H. Khalil and S.L. Regunathan, "*Open-Loop Design of Predictive Vector Quantizers for Video Coding*", Proc. IEEE Intl. Conf. Image Processing, Oct. 1998.

J. Shen, "*Efficient Motion Estimation And Quantization Algorithms For Low-Bit-Rate Video Coding*", Chicago, Illinois, published Apr. 28, 2000.

J. Shen and W.Y. Chan, "*A Novel Code Excited Pel-Recursive Motion Compensation Algorithm*", Intl. Conf. Image Processing, Sep. 2000.

J. Shen and W.Y. Chan, "*Vector Quantization of Affine Motion Models*", Proceeding of IEEE Intl. Conf. Image Processing, Oct. 1999.

D.R. Walker and K.R. Rao, "*Improved Pel-Recursive Motion Compensation*", IEEE Trans. on COM, vol. 32, No. 10, pp. 1128-1134, Oct. 1984.

D.R. Walker and K.R. Rao, "*Motion-Compensated Coder*", IEEE Trans. on COM, vol. 35, No. 11, pp. 1171-1178, Nov. 1987.

\* cited by examiner

52

| error vector index | error vector |
|---|---|
| 000001 | 3 2 4 5 1 0 6 7 ............ 5 |
| 000002 | 5 1 6 8 2 2 7 0 ............ 3 |
| 000003 | 0 1 3 4 5 1 0 2 ............ 0 |
| 000004 | 1 1 0 3 4 1 1 0 ............ 5 |
| 000005 | 7 3 1 2 2 2 9 0 ............ 2 |

METHODS AND APPARATUS FOR ENCODING A VIDEO SIGNAL

CROSS-REFERENCE TO RELATED APPLICATION

This application claims priority under 35 U.S.C. §119(e) from co-pending U.S. Provisional Patent Application No. 60/231,085 filed Sep. 8, 2000, naming Jiandong Shen et al. as inventors, and titled "Code Excited Pel-Recursive Motion Compensation Video Encoding", which is incorporated by reference herein for all purposes.

U.S. GOVERNMENT RIGHTS

This application was made in part with government support under Grant number MIP-9502629 awarded by the National Science Foundation. The government has certain rights in the invention.

BACKGROUND OF THE INVENTION

The present invention relates generally to systems and methods for compressing, decompressing, and transmitting video data.

Video data is transmitted in a bitstream, or a continuous sequence of binary bits used to digitally represent compressed video, audio or data. The bitstream is transmitted over a transmission channel. One problem with existing transmission channels is their ability to transport video data. In multimedia streaming applications for example, the video data requires significant bandwidth from a communication channel.

Since transmission of video data with existing communication channels is often excessive, compression is an approach that has been used to make digital video images more transportable. Digital video compression schemes allow digitized video frames to be represented digitally in much more efficient manner. Compression of digital video makes it practical to transmit the compressed signal using digital channels at a fraction of the bandwidth required to transmit the original signal without compression. International standards have been created for video compression schemes. These include MPEG-1, MPEG-2, MPEG-4, H.261, H.262, H.263, H.263+, etc. These standardized compression schemes rely on several algorithm schemes such as motion compensated transform coding (for example, DCT transforms or wavelet/sub-band transforms), quantization of the transform coefficients, and variable length coding (VLC).

Motion estimation is used during encoding of video data to remove the temporally redundant information between video frame sequences. In many compression schemes, motion estimation produces motion vectors that quantify the temporal difference between two successive frames. The motion vectors are transmitted with the compressed bitstream to a target decoder. During decompression of the compressed video by the decoder, motion compensation uses the motion vectors to produce a predicted frame in order to reconstruct the video data. The predicted frame is not a perfect representation of the actual video data. The difference between the actual video data and the motion compensation prediction is referred to as the motion compensation error, or residual error.

In many motion estimation schemes, such as MPEG-x, a frame is partitioned into blocks to reduce the transmission cost in sending the coded motion vectors. A motion vector is then estimated for each block, and transmitted with the encoded data. As the block size increases, the number of motion vectors sent—and the transmission burden—decreases. However, as the block size increases, it becomes harder to find a matched block in a previous frame. As the block size decreases, accuracy for the predicted frame improves. However, the motion vectors require significant bits during compressed transmission; and decreasing the block size thus becomes expensive for transmitting the compressed data.

The pel-recursive motion compensation algorithm is a form of motion compensation that is applied on a pel-by-pel, or pixel-by-pixel, basis (or on a small block of pels). One advantage of this algorithm is that it requires no motion vectors to be transmitted, thus allowing pixel by pixel motion compensation without inducing excessive transmission burden. For this reason, it appeals to low bit rate video coding applications.

Pel-recursive methods produce a residual error. Conventional pel-recursive methods quantize the residual error on a pixel-by-pixel basis. Quantization reduces the number of levels required to represent data. Conventional pel-recursive motion compensation algorithms rely on scalar quantization of the motion compensation error signal. Since error is quantified and encoded pixel by pixel, scalar quantization of the residual error results in excessive bit usage and transmission burden and thus limits the performance of pel-recursive video coding systems.

Based on the foregoing, there is a need for a method and system for encoding, decoding and transmitting video data that maintains pixel based motion estimation and compensation but does not require excessive bandwidth.

SUMMARY OF THE INVENTION

The present invention overcomes the deficiencies and limitations of the prior art with improved systems and methods for compressing, decompressing, and transmitting video data. The systems and methods include pixel by pixel motion estimation and efficient quantization of residual errors. The pixel by pixel motion compensation maintains the temporal accuracy between frames. The residual error management methods described herein improve transmission efficiency.

In one embodiment, the present invention groups residual errors into blocks and applies a block estimation to each block. This block estimation approximates residual error values using an array of predetermined residual errors stored within a set of error vectors. The error vectors are maintained in a codebook. A copy of the codebook is included in an encoder of the present invention and converts an error vector for each block to an error vector index. The error vector index, which introduces minimal transmission burden, is then sent during transmission to a receiving decoder. The receiving decoder also includes a copy of the codebook; and converts the error vector index to its associated error vector and corresponding predetermined residual errors for reconstruction of the compressed video data.

In one aspect, the present invention relates to a codebook for use in encoding and decoding video data. The codebook comprises a set of error vectors and an error vector index associated with each error vector. Each error vector in the set of error vectors includes a predetermined set of motion compensation errors.

In another aspect, the present invention relates to a system for providing a bitstream having compressed video data. The system comprises an encoder apparatus that receives uncompressed video data and outputs compressed video data. The encoder apparatus comprises a codebook comprising a set of error vectors and an error vector index associated with each error vector, each error vector in the set of error vectors comprising an array of predetermined motion compensation errors. The encoder apparatus also comprises a local decoder that generates synthesized video data according to an error vector provided by the codebook.

In yet another aspect, the present invention relates to a method for encoding video data. The method comprises generating synthesized video data for a portion of video data using predetermined motion estimation errors. The method also comprises comparing the synthesized video data with raw video data for the portion to generate a synthesis error for the portion. The method further comprises selecting an error vector index for the portion based on the synthesis error.

In still another aspect, the present invention relates to a system for providing video data. The system comprises a decoder apparatus configured to receive a bitstream comprising compressed video data and an error vector index, and configured to output the video data in an uncompressed format. The system also comprises a codebook comprising a set of error vectors and an error vector index associated with each error vector, each error vector in the set of error vectors comprising an array of predetermined motion compensation errors.

In yet another aspect, the present invention relates to a method for decoding video data. The method comprises receiving a compressed bitstream containing the video data and an error vector index. The method also comprises converting the error vector index to an error vector, the error vector comprising an array of predetermined motion compensation errors. The method additionally comprises decoding a portion of the video data into an uncompressed format using the error vector. The method further comprises outputting the video data in the uncompressed format.

In another aspect, the present invention relates to a method for constructing a codebook. The codebook comprises a set of error vectors and an error vector index associated with each error vector. Each error vector in the set of error vectors comprising an array of predetermined motion compensation errors. The method comprises generating a cluster center for each error vector in the codebook. The method also comprises receiving a set of motion compensation error blocks. The method further comprises assigning each of the motion compensation error blocks to a cluster. The method additionally comprises updating the cluster center for each error vector in the codebook to form a new cluster center for each error vector in the codebook. The method also comprises designating the new cluster center for each error vector in the codebook as the array of predetermined motion estimation errors for each error vector in the codebook.

In yet another aspect, the present invention relates to a system for encoding video data. The system comprises means for generating synthesized video data for a portion of video data using predetermined motion compensation errors. The system also comprises means for comparing the synthesized video data with raw video data for the portion to generate a synthesis error for the portion. The system further comprises means for selecting an error vector index for the portion based on the synthesis error.

In another aspect, the present invention relates to a system for providing video data. The system comprises means for receiving a compressed bitstream containing the video data and an error vector index. The system also comprises means for converting the error vector index to an error vector, the error vector comprising an array of predetermined motion compensation errors. The system further comprises means for decoding a portion of the video data into an uncompressed format using the error vector. The system additionally comprises means for outputting the video data in the uncompressed format.

In yet another aspect, the present invention relates to a computer readable medium including instructions for encoding video data. The instructions comprise instructions for generating synthesized video data for a portion of video data using predetermined motion compensation errors. The instructions also comprise instructions for comparing the synthesized video data with raw video data for the portion to generate a synthesis error for the portion. The instructions also comprise instructions for selecting an error vector index for the portion based on the synthesis error.

These and other features and advantages of the present invention will be described in the following description of the invention and associated Figures.

BRIEF DESCRIPTION OF THE DRAWINGS

The present invention is illustrated by way of example, and not by way of limitation, in the figures of the accompanying drawings and in which like reference numerals refer to similar elements and in which:

FIG. 3 illustrates codebook used in the encoding apparatus in accordance with one embodiment of the present invention.

DETAILED DESCRIPTION OF THE PREFERRED EMBODIMENTS

Figure 1A:
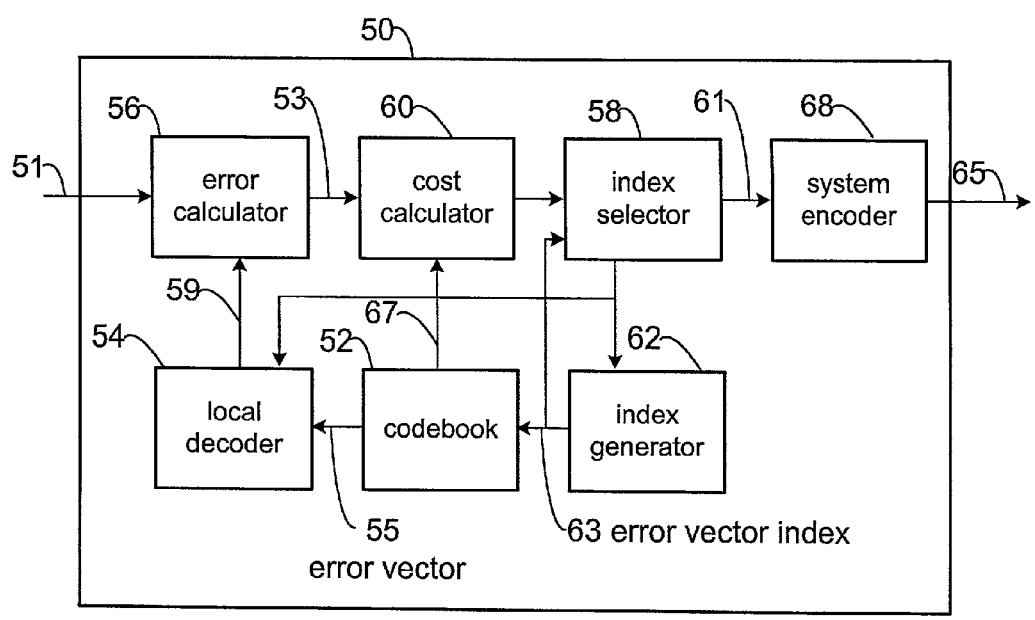
FIG. 1A illustrates an encoding apparatus in accordance with one embodiment of the present invention.

The present invention will now be described in detail with reference to a few preferred embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In some instances, well known process steps and/or structures have not been described in detail in order to not unnecessarily obscure the present invention.

In one aspect, the present invention relates to a video encoder. The encoder comprises a local decoder. The local decoder synthesizes decoder output that would result from encoding using a set of error vectors. The error vectors include predetermined motion compensation errors for each pixel in a block. Thus, the local decoder produces synthesized decoded video output using different sets of predetermined motion compensation error values. The synthesized video output is compared to the original video. After examining the suitability of each error vector, the encoder selects an error vector for a block. A codebook included in the encoder indexes the error vector and converts the error vector into an error vector index, or its codeword representation. The error vector index is then transmitted from the encoder with the compressed bitstream.

In another aspect, the present invention relates to a video decoder. The decoder performs pixel by pixel motion estimation of video data. In one embodiment, the decoder uses pel-recursive motion estimation to generate motion vectors on a pixel by pixel basis. Since the decoder is capable of generating the motion vectors, it is not necessary to transmit motion vectors in a compressed bitstream received by the decoder. The decoder includes a copy of a codebook having error vectors and associated error vector indices. After receiving a compressed bitstream and error vector index from an encoder with a similar codebook, the decoder uses its codebook to convert each error vector index as transmitted to a set of residual errors for a block. The decoder then reconstructs the video data using the residual errors.

In another aspect, the present invention relates to a codebook used to encode and decode video data. The codebook comprises a set of error vectors and indexes each error vector with an error vector index. During encoding, video data for a block are compared with synthesized data produced from each error vector in the codebook. From this comparison, a single error vector is selected to represent the motion compensation error for the block. The selected error vector is then indexed. Instead of transmitting the error vector, the error vector index is transmitted with the compressed bitstream.

Encoding of a bitstream refers to the process of converting displayable video data to a compressed format that reduces the bit rate required to send the data. The system that is used to compress, or encode, digitized video sequence is called an encoder or encoding apparatus.

FIG. 1A illustrates an encoding apparatus 50 in accordance with one embodiment of the present invention. Encoding apparatus 50 receives a block of uncompressed video data 51 and compresses the video data for transmission to a target receiver or decoder. Encoding apparatus 50 comprises a codebook 52, a local decoder 54, an error calculator 56, a cost calculator 60, an index selector 58, an index generator 62, and a system encoder 68.

Compression according to encoding apparatus 50 includes a pixel-by-pixel based motion estimation and compensation, block quantization of the residual errors and using indices to represent the quantized residual errors. Thus, a compressed bitstream 65 produced by encoding apparatus 50 allows a target decoder to reconstruct temporal differences between frames of the video data on a pixel by pixel basis. In addition, compressed bitstream 65 does not include motion vectors—thus reducing its bit usage and required bit rate for transmission. Further, compressed bitstream 65 includes indices that specify the motion compensation errors for blocks of video data in the compressed bitstream 65. The indices are sent with compressed bitstream 65 and further reduce the bit rate for sending compressed bitstream 65 relative to individually sending the motion compensation errors for each pixel.

In one embodiment, encoding and decoding according to the present invention occurs on a block or macroblock level. As the term as used herein, a 'block' refers to a spatial region in an image pixel plane of any suitable shape. Typically, the blocks are square or rectangle.

In one embodiment, pixels in a block are scanned in a predefined order to form the ordered components of a code vector. The scanning order many be chosen such that motion vector predictor is able to produce a useful predicted motion vector based on all motion vector information currently available, as will be described in further below.

Instead of sending a quantized residual error for each pixel in a block, encoding apparatus 50 applies block quantization to the residual errors, which approximates a block of residual errors with an error vector selected from codebook 52.

Codebook 52 comprises a set of predetermined motion compensation error vectors 55, each of which is associated with an error vector index 63. The dimension of the error vector in the codebook 52 equals the size of the input video block 51. For example, if the input video block has a 4×4-pixel region, the error vector should include 16 predetermined residual errors.

Feasibly, each block in a video frame may have a unique set of residual errors. However, since the block size is limited, the number of difference error vectors 55 required to represent the block errors is limited. More specifically, the number of possible combinations of predetermined residual errors for a block of pixels is limited. Correspondingly, the number of error vectors 55 required to represent the residual errors for compressed video data may be a subset of this limited number. A small number of error vectors 55 can be addressed by a small error vector index 63 and results in minimal transmission burden for transmitting error vector index 63. Generation of the error vectors in codebook 52 will be described in further detail below with respect to FIG. 4. The size of the quantization blocks may vary according with an application.

Before video data 51 is transmitted from encoding apparatus 50, the best error vector for the block needs to be found. Error vector searching in encoding apparatus 50 is a process where video data is repeatedly synthesized for a block using different predetermined error vectors stored in a codebook 52.

The collection of all possible error vector indices constitutes a set of candidates that can be searched by the encoder apparatus 50. An index generator 62 is used to conduct the search. One at a time, the index generator sends an error vector index to codebook 52. According to the received index value, codebook 52 produces an error vector 55 that is to be used for synthesis purpose.

Encoder apparatus 50 uses a local decoder 54 to synthesize output video data that would be produced by a target receiver or decoder. In one embodiment, local decoder 54 generates a block of synthesized video data 59 according to a residual error vector 55 provided by codebook 52.

Local decoder 54 performs pel-recursive motion estimation to produce motion vectors for each pixel in a block. Local decoder 54 outputs a block of synthesized video data 59 using these motion vectors and using predetermined residual errors provided by error vector 55. A specific example of how local decoder 54 generates the synthesized video block 59 will be described in further details with respect to FIG. 1B. Synthesized video block 59 may not be identical to the uncompressed video block 51. The difference is quantified by the error calculator 56 and cost calculator 60 in the form of a general distortion measure.

Error calculator 56 compares a block of uncompressed video data 51 with synthesized video block 59 produced by local decoder 54. Error calculator 56 produces a synthesis error 53 that describes the difference between the synthesized video block 59 and the block of uncompressed video data as received. In other words, the synthesis error 53 represents the error between the video data before compression and the video data after being encoded and decoded within the encoding apparatus 50. In one embodiment, error calculator 56 applies a mean squared error to quantify the synthesis error 53. Since the video data was encoded and decoded using one error vector 55 of many error vectors in codebook 52, the synthesis error 53 then pertains to a specific error vector 55.

Cost calculator 60 extends the distortion measure of error calculator 56 and allows the use of more general distortion measures for comparing uncompressed video data with synthesized video data. In a specific embodiment, a joint rate-distortion cost is used as the distortion measure. An example of the rate-distortion cost compuation formula is $D+\lambda R$, where D is the synthesis error produced by error calculator 56, R is the entropy or bit-rate for coding the error vector index 67, and $\lambda$ is a nonnegative value. Generally, a larger $\lambda$ is used to achieve a lower bit rate for transmission to the decoder.

The process of providing an error vector 55, synthesizing video data 59 based on error vector 55, comparing the synthesized video data 59 to the original video data 51, and measuring the synthesis error 53 and cost 61 is repeated for each code vector in codebook 52. The resulting costs are provided to index selector 58.

Index selector 58 receives the error vector indices from the codebook 52 and their associated synthesis costs produced by cost calculator 60. Index selector 58 selects the best error vector index 61 for the current block. In one embodiment, index selector 58 determines the best error vector index 61 using the minimum synthesis cost as provided by cost calculator 60.

The best error vector 61 for current block is then sent to system encoder 68, which appends or embeds the best error vector index 61 into a compressed bitstream 65. Compressed bitstream 65 includes compressed video data for reconstructing uncompressed video data 51 (e.g., I frame for each GOP), picture level information (e.g., block size) and compression syntax for transmitting compressed bitstream 65 (e.g., system layer protocol data). In one embodiment, a motion vector is determined for the first pixel in a block by the system encoder 68 and sent with the compressed bitstream 65 to facilitate motion estimation for the block. The motion vector is then used during decompression to provide the initial motion vector estimate for the first pixel. Thus, the best error vector indices 61 for each block video data in uncompressed video frame are embedded or combined with other compressed video data to produce compressed bitstream 65.

Compressed bitstream 65 is output from encoding apparatus 50. In one embodiment, encoding apparatus is included in a network having a network interface suitable for transmitting compressed bitstream 65 onto a network channel. The network interface transmits compressed bitstream 65 onto a channel that formats the data and transmits it to a conventional transmission system, including but not limited to xDSL, ATM/ADSL, ATM, ISDN links, Ethernets, public data networks, T1, T3, DS-3, OC-3, wireless/terrestrial networks, digital satellites, and digital cable networks. In one embodiment, compressed bitstream 65 is transmitted in real-time. Compressed bitstream 65 is then received by a target decoder, such as decoder 270 of FIG. 5. The receiving decoder uses the best error vector index 61 for each block of video data in compressed bitstream 65 to decode compressed bitstream 65.

The encoder apparatus 50 may be a single structure or multiple structures. In one embodiment, the encoder apparatus 50 is implemented in ASIC hardware. In another embodiment where storage based multicasting of pre-encoded content is the application, the encoder apparatus 50 is implemented in software.

Collectively, the present invention reduces the bit rate required to represent a video frame using several techniques. In the first technique, the temporal difference between frames is reconstructed using a pixel-by-pixel motion estimation and compensation method, which also requires no extra bits to send the motion vectors. In the second technique, the set of block motion compensation errors is reduced to a subset as determined by the error vectors stored within codebook 52. In the third technique, the present invention associates an index with each code vector stored in codebook 52. It is the code vector index that is transmitted with the compressed bitstream to designate the motion compensation errors for each block in a compressed frame. The code vector index may be coded, using variable length coding for example, to further reduce the transmission burden of sending residual errors.

Figure 1B:
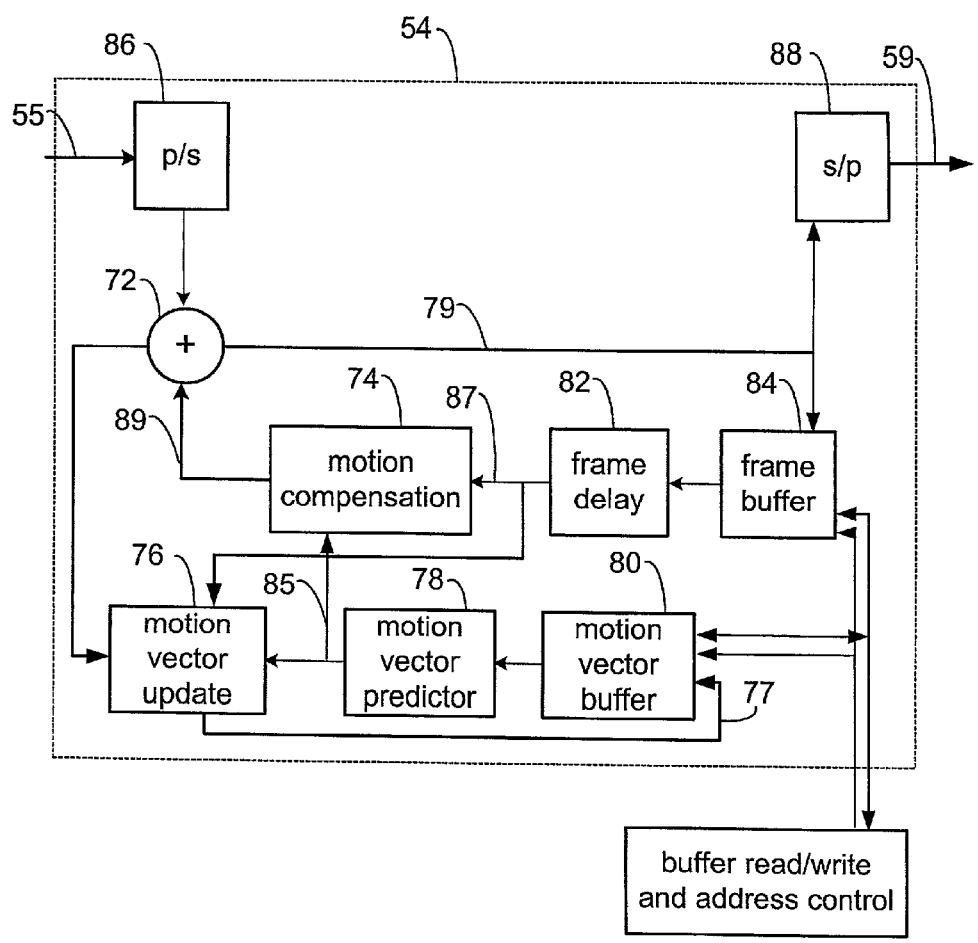
FIG. 1B illustrates the local decoder used in the encoding apparatus of FIG. 1A in accordance with one embodiment of the present invention.

FIG. 1B illustrates local decoder 54 in accordance with one embodiment of the present invention. Local decoder 54 synthesizes video data for encoder 50 to determine which error vector and its associated index will be used to best reconstruct the input video block 51.

Local decoder 54 receives error vectors 55 from codebook 52 and generates a synthesized video block for each error vector. Local decoder 54 synthesizes video data on a pixel-by-pixel basis. While local decoder 54 will now be described as an apparatus composed of units, those skilled in the area will recognize that the present invention encompasses a method, process or software having as steps the actions performed by each unit and described below.

Local decoder 54 comprises a pixel summation unit 72, a motion compensation unit 74, a motion vector updater 76, a motion vector predictor 78, a motion vector buffer 80, a frame delay 82, a frame buffer 84, a parallel to serial converter 86 and a serial to parallel converter 88. In one embodiment, local decoder 54 uses a pel-recursive motion estimation that produces motion vectors for each pixel in a block. Pel-recursive motion estimation is a three-step process of motion vector prediction, motion compensation, and motion vector update.

Local decoder 54 starts its synthesis process by receiving an error vector from codebook 52 which contains an array of motion compensation error values for each pixel in the block. The error vector is submitted to parallel to serial converter 86, which outputs the pixel residual errors 71 according to the order used by the encoder to scan the pixels in the input video block.

Motion vector predictor 78 predicts a motion vector at each pixel using motion vectors in motion vector buffer 80 as defined by a support region for the pixel. In a specific embodiment, motion vector prediction is a form of backward motion estimation that the motion vector of the current pixel is predicted using motion vectors from two pixels that were previously processed. This implies that at least two previous pixels have been processed. For raster order reconstruction of pixels in a block, the first two pixels in the block may be constructed using motion estimation information from previous blocks. Alternatively, one of the two first pixels may begin with an arbitrary value or a value specifically provided during encoding. The motion vector of the third pixel may be predicted by taking an average of the motion vectors of the two previous pixels. Similarly, motion vector of each pixel in continuing raster order may be predicted using an average of the motion vectors of the two previous pixels. Motion vector predictor 78 uses a causal neighborhood for motion vector prediction, e.g., pixels in the left, upper and upper left region of the current pixel. The advantage of backward motion estimation in this manner is that motion vectors for each pixel need not be sent with the compressed video data and yet motion compensation may be performed by a receiving decoder on a pixel by pixel basis. Motion vector predictor 78 outputs a predicted motion vector 85 for a pixel.

Motion compensation unit 74 receives a predicted motion vector 85 for each pixel in a block as determined by motion vector predictor 78 and receives the previous frame 87 from frame delay 82. Motion compensation unit 74 performs motion compensation for each pixel using reconstructed pixels in the previous frame 87 and outputs a motion compensation predicted pixel 89. In a specific embodiment, a 4-tap cubic interpolator is used to calculate the compensated intensity value for non-integer displacement of the current pixel.

A summation unit 72 receives the pixel residual error 71 from P/S unit 86 and motion compensation predicted pixel 89 from motion compensation unit 74. The output of summation unit 72 is a synthesized reconstructed pixel 79. Frame buffer 84 receives the reconstructed pixel 79 as provided by summation unit 72 and stores it for subsequent pixel motion compensation and processing.

A serial to parallel converter 88 receives the reconstructed pixel 79 one pixel a time and then converts it into an array of synthesized video block 59 in the reversed order of the P/S unit 86. The synthesized video block 59 is the output of the local decoder 54.

Motion vector update unit 76 receives the reconstructed pixel 91 from summation unit 72, the previous frame 87 from frame delay 82 and the predicted motion vector 85 from motion vector predictor 78 and outputs an updated motion vector for the current pixel. In one embodiment, a conventional gradient-based motion vector updating method is used to calculate the updated motion vector. In a specific embodiment, the gradient calculation is performed using a 4-tap derivative cubic filter.

Frame buffer 84 stores the reconstructed pixels of the frame being decoded. Prior to decoding codewords for the next video frame, the content of frame buffer 84 is transferred to frame delay 82, which is used to hold the previously decoded frame.

Motion vector buffer 80 stores the updated motion vectors 77 of the frame being decoded and serves as a data source for the motion vector predictor 78.

Figure 1C:
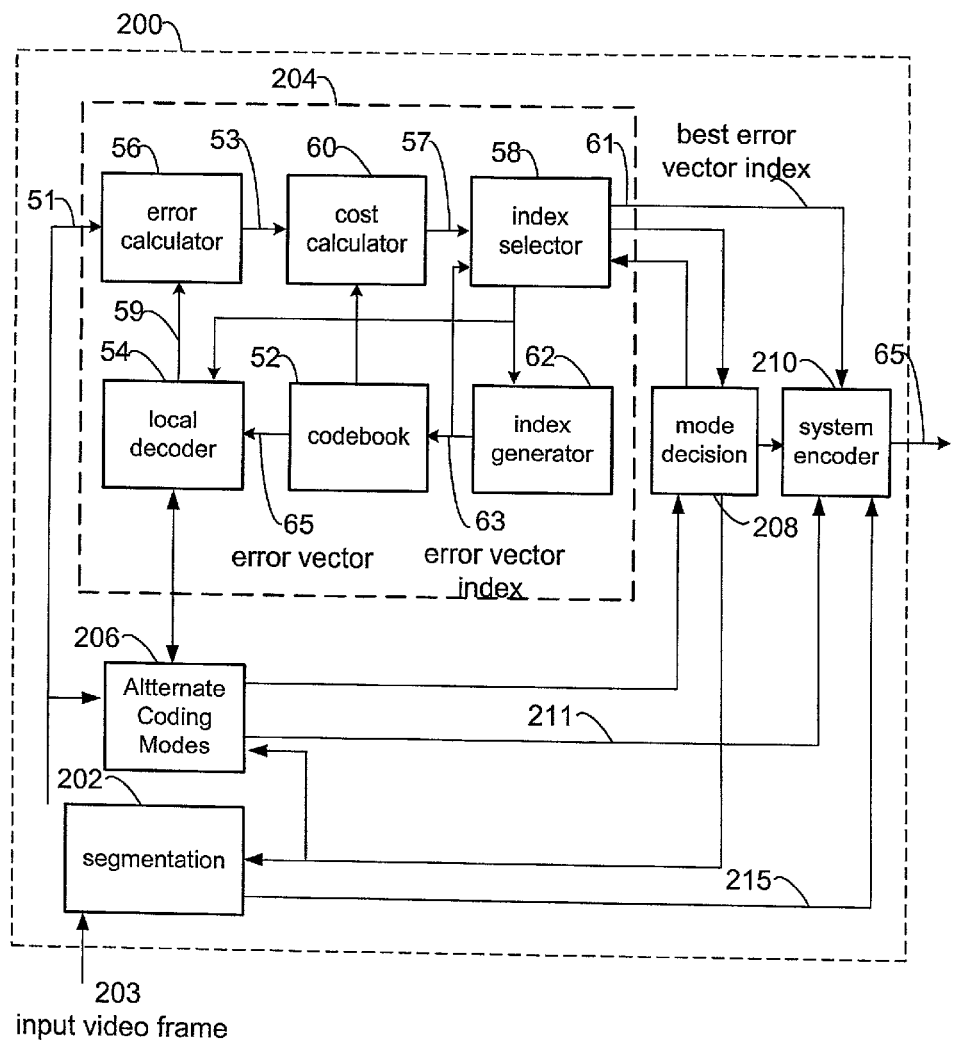
FIG. 1C illustrates an encoding apparatus in accordance with another embodiment of the present invention.

FIG. 1C illustrates an encoding apparatus 200 in accordance with another embodiment of the present invention. Encoding apparatus 200 provides a multiple coding mode system. In a multiple coding mode system, there could be numerous other video coding methods or modes, such as conventional DCT based INTRA block coding mode and the MC/DCT based INTER block coding mode as used in the MPEG standards. These coding modes are selectively chosen along with compression according to codebook based encoder to achieve the most efficient coding performance for different portions of input video data.

Encoding apparatus 200 comprises a segmentation module 202, a codebook encoder module 204, an alternate coding modes module 206, a mode decision module 208 and a system encoder module 210.

Segmentation module 202 partitions an input video frame 203 into blocks 51.

Codebook encoder 204 performs video encoding using method of encoder 50 as described with respect to FIG. 1A. Codebook encoder 204 has a similar structure as encoder 50, which comprises of a codebook 52, a local decoder 54, an error calculator 56, a cost calculator 60, an index generator 62 and an index selector 58. Similar to encoder 50, the codebook encoder 204 uses the local decoder 54 to synthesize a block of reconstructed pixels for each given motion compensation error vector. This allows the encoder 204 to determine the best error vector for representing the input video block 51. A codebook 52 is used to store all the error vectors that is allowed to be used within the system. For each error vector, there is an index associated with it. Encoder 204 uses index generator 62 to drive a search over all the possible index values in order to find the best candidate index. The error calculator 56 and cost calculator 60 are also similar to that defined in encoder 50. For each synthesized video block, a general distortion measure is calculated and sent to the index selector 58. In specific embodiment, a similar joint rate-distortion measure as described in encoder 50 is used. The index selector 58 compares the costs of all the indices and produces the best error vector index and its associated cost value.

Alternate coding modes 206 is a generic module, which contains all the feasible encoding methods other than the codebook encoding method described in encoder 204. There are numerous proprietary video data compression formats that may be deployed in alternate coding modes 206. Public video data compression formats include numerous international standards built upon video data compression schemes such as MPEG-1, MPEG-2, MPEG-4, H.261, H.263, H.263+, wavelet, fractal, etc.

Mode decision 208 determines which coding mode should be used for a particular block. Mode decision module 208 receives the measured encoding cost from all the coding modes and selects the mode with the minimum cost. In one embodiment, several encoding modes are used to encode the same block, and the best encoding output is selected to represent the block. For example, decision module 208 may select an encoding mode for a block of video data in order to produce the lowest compressed bit rate for the output of the compressed video data. The results of decision module 208 may be provided to segmentation module 202 to refine segmentation, e.g., alter the block size.

System encoder 210 receives information about the selected encoding mode from decision module 208. When codebook encoder 204 is used to compress the current video block, system encoder 210 simply gets the best error vector index 61 from the index selection 58. When an other coding method is used for encoding the input video block, system encoder 210 simply gets the compression data 211 from alternate code modes 206. System encoder 210 then embeds the best error vector index 61 or compressed data 211, along with the segmentation information 215 into the compressed bitstream 65. Similar to system encoder 68 as described with respect to FIG. 1A, system encoder 210 also embeds into the compressed bitstream 65 other necessary coded information, such as compressed video data (e.g., I-frame for each GOP), picture level information (e.g., block size) and compression syntax (e.g., system layer protocol data). In this way, the decoder is able to decompress the bitstream 65 and reconstruct the uncompressed video frames 203.

Mode decision 208 also informs the index selector 58 and alternate code modes 206 the chosen mode. These modules will perform properly to update the frame buffer and the motion vector buffer inside the local decoder 54. For encoding according to codebook encoder 204, the update is performed by informing the index generator to provide the selected code vector into local decoder. If another coding mode is chosen, the local decoder buffers are updated with reconstructed pixel intensities and motion vectors produced by the chosen mode. Encoder 200 may then proceed to encode the next input block.

Figure 2:
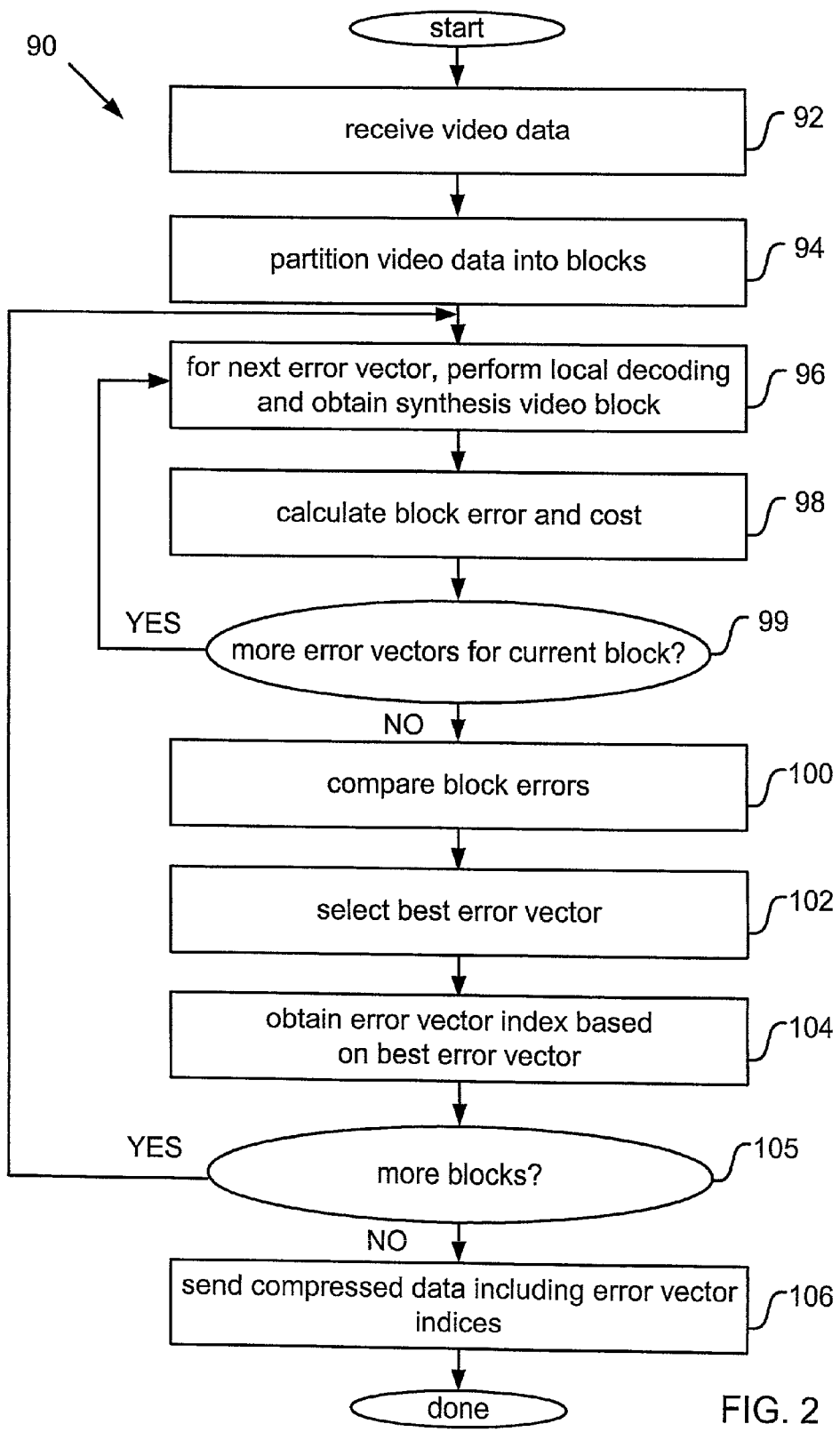
FIG. 2 illustrates a process flow for encoding video data in accordance with one embodiment of the present invention.

FIG. 2 illustrates a process flow 90 for encoding video data in accordance with one embodiment of the present invention. Process flow 90 may take place in any network device such as the network device 700 of FIG. 7. Processes in accordance with the present invention may include up to several additional steps not described or illustrated here in order not to obscure the present invention. While compressed video bitstream processing will now be described as a method, those skilled in the area will recognize that the present invention encompasses a system or software having units capable of performing the actions as described below.

Process flow 90 begins by receiving uncompressed video data (92). The uncompressed video data is then partitioned into blocks (94). In a specific embodiment, each block comprises a 4×4 pixel array. A local decoder within the encoder performs motion estimation and compensation on each block and synthesizes video output for the block (96). In a specific embodiment, the local decoder performs pel-recursive motion compensation on each pixel in the block to generate the synthesized video block and uses an error vector comprising an array of predetermined motion estimation errors for each pixel in a block. A codebook stores a set of error vectors and provides each error vector in turn to the local decoder.

The synthesized video output is then compared to the raw video data as received to obtain a synthesis error (98). Each error vector in the codebook may produce a different synthesized output and thus a different synthesis error for each block. In turn, each error vector from the codebook is used to produce a synthesized output and resulting synthesis error (99). The synthesis is then combined with other information to produce a more general distortion measure. In one embodiment, the bit rate for coding the error vector index is combined with a rate-distortion measure to produce an overall cost. In one embodiment, every code vector in the codebook is searched in order to find the best error vector index. The costs may be stored in a buffer until the costs for all code errors have been generated.

The costs produced for each error vector are then compared to see which error vector produced the minimum cost for a block (100). The error vector with the minimum cost is selected (102) and its corresponding error vector index is obtained (104). In turn, an error vector index is obtained for each block in the current frame (105). The compressed video data including error vector indices are then transmitted from the encoding apparatus (106). In one embodiment, the compressed data includes at least one I frame in a Group of Pictures used to reconstruct other frames in the group of pictures.

In one embodiment, compression according to process flow 90 is used within a multiple encoding mode system as described with respect to FIG. 1C. In this manner, process flow 90 may be applied to a broader range of video encoding applications.

Having discussed a suitable encoding apparatus and methods in accordance with several embodiments of the present invention, codebook construction will now be expanded upon. FIG. 3 illustrates codebook 52 in accordance with one embodiment of the present invention. Codebook 52 includes a set of error vectors 120. Each error vector 120 includes a predetermined residual error for each pixel within a defined block. The order of the component of the code vectors is formed in a predefined order such as that used in scanning the pixels in a video block. For example, each error vector may include 16 predetermined motion estimation errors for a 4×4 block.

Each error vector 120 is associated with an error vector index 122. The error vector index 122 is a reference within codebook 52 that designates a specific error vector 120. As both an encoding apparatus and a receiving decoder both comprise codebook 52, only the error vector index 122 need be sent in order to transmit the residual errors for a particular block.

Codebook 52 construction and design may vary. For example, codebook 52 size may vary. Generally, as the number of error vectors 120 increases, e.g., from 10 to 1000, the accuracy of the error vectors 120 in representing the block motion estimation errors increases. However, as the number of error vectors 120 increases, so does the transmission cost in transmitting a larger error vector index 122 number. In one embodiment, codebook 52 has between about 256 code vectors and about 4096 vectors for a 16 pixel block. In a specific embodiment, codebook 52 has between about 512 code vectors and about 200 code vectors for a 16 pixel block. Other codebook design parameters include the number of pixels in each block and what predetermined residual error values are used.

In one embodiment, motion compensation errors in each error vector 120 are quantized. More specifically, codebook 52 quantizes residual errors in each error vector 120. The error vector residual errors may be quantized to integer (as shown in FIG. 3) or floating numbers such as 3.145692.

Figure 4:
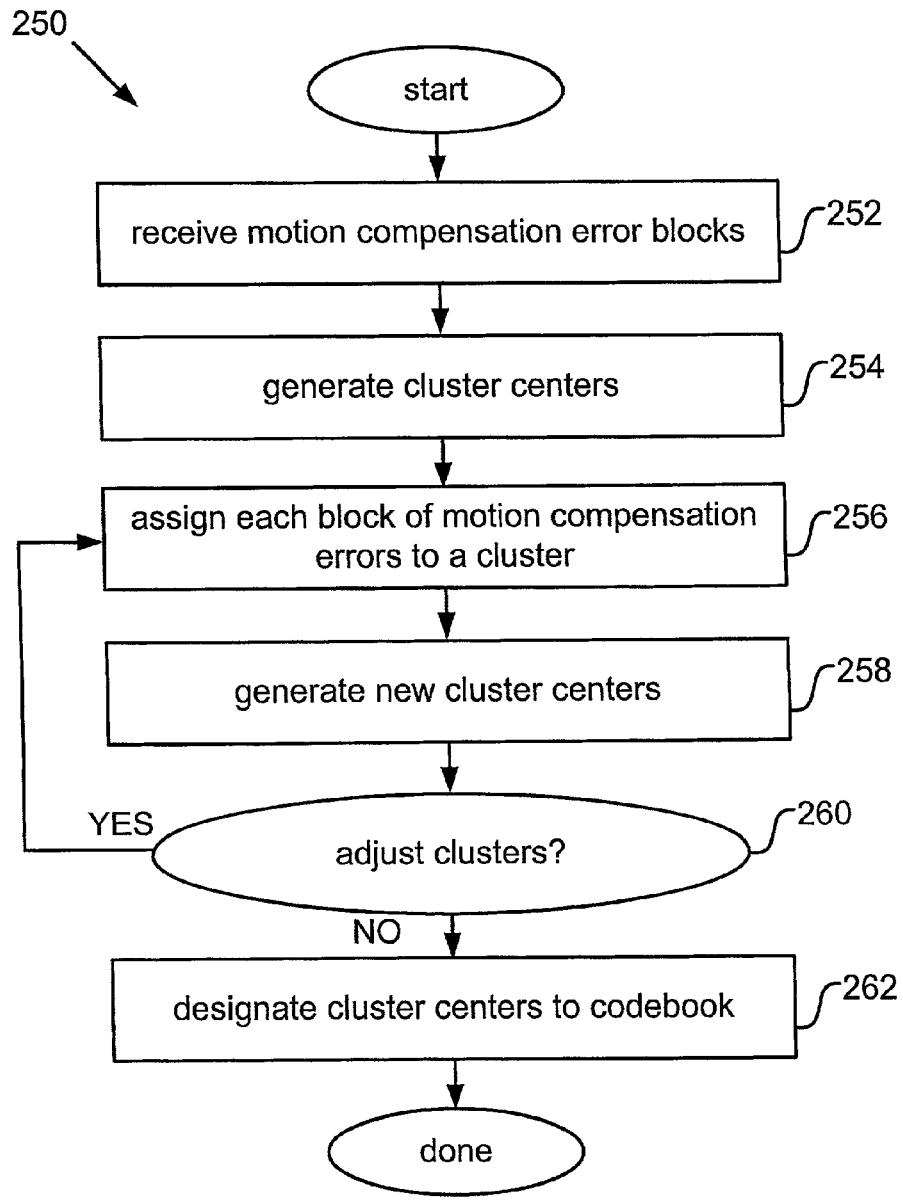
FIG. 4 illustrates a process flow for codebook construction using clusters in accordance with one embodiment of the present invention.

One aspect of codebook construction according to the present invention is what predetermined residual error values are used within each of the code vectors. In accordance with one embodiment of the present invention, determining residual error values for each code vector 120 is an iterative process of cluster generation and update. A cluster represents an array of block residual errors. A cluster may be thought of as a way to partition and group block residual errors for the purpose of assigning error vectors and determining predetermined residual error values. FIG. 4 illustrates a process flow 250 for codebook construction using clusters in accordance with one embodiment of the present invention.

Process flow 250 begins by receiving blocks of residual errors (252). For example, a video frame may provide 256 blocks, and motion compensation produces residual errors for each block, thus producing 256 residual error blocks. A collection of blocks of residual errors is known as the training set. A cluster center is generated for each error vector index 122 in codebook 52 (254). The cluster center represents the current value of predetermined residual error values in the cluster. In one embodiment, the cluster centers are initially determined randomly. This random determination originally acts as a cluster center for comparison with residual errors in each of the block errors as received (252).

Each residual error block from the training set is then placed in a cluster (256). In one embodiment, a block of motion compensation errors is assigned to a cluster based on proximity. More specifically, a residual error block is assigned to the cluster having the cluster center closest to the block of residual errors. A mean square error is suitable to determine a quantitative difference between a residual error block and a cluster center. But other distortion measures can also be used. Alternatively, the average distance between each residual pixel error and the closest cluster center is suitable to determine a quantitative difference between the residual error block and a cluster. At this point, each cluster contains an initial array of block residual errors.

After all residual error blocks have been assigned to different clusters, new cluster centers are generated (258). In one embodiment, a new cluster center for each cluster is generated by averaging the initial predetermined residual error values in the cluster with the residual errors for each block assigned to that cluster.

The process of assigning each block of residual errors to a cluster is then iteratively repeated (256 and 258). More specifically, after the cluster centers are updated, each block of residual errors is reassigned to an updated cluster center. The block of residual errors is again reassigned based on proximity between the residual errors and its closest updated cluster center. As iteration continues, a residual error block may change to a new cluster or may remain in the same cluster as a previous iteration. Thus, the constituents of each cluster may vary. Correspondingly, the cluster centers for each cluster will change as iteration continues and cluster constituents change. In one embodiment, reassigning block errors and cluster center update continues until the process converges (260). The final set of cluster centers are then designated as the predetermined residual errors for an error vector 120 in codebook 52 (262). Each error vector 120 is then associated with an index 122 within the codebook.

When process flow 250 is finished, a codebook and its constituent code vectors 120 have been determined. In one embodiment, hundreds or thousands of frames are used to statistically determine the error vectors 120. Since the code vectors 120 represent an approximation of the motion compensation errors for hundreds and thousands of video data blocks, increasing accuracy during cluster center determination and code vector assignment may improve output video for a decoder. Although one specific implementation of codebook 52 is described in detail, it is understood that other codebook configurations and design may be adapted to fit a particular application. Indeed, an advantage of the present invention is that codebook 52 structure and configuration is adaptable to a specific application. In a specific embodiment, conventional algorithms for designing predictive vector quantization codebooks are suitable for use with the present invention.

Figure 5:
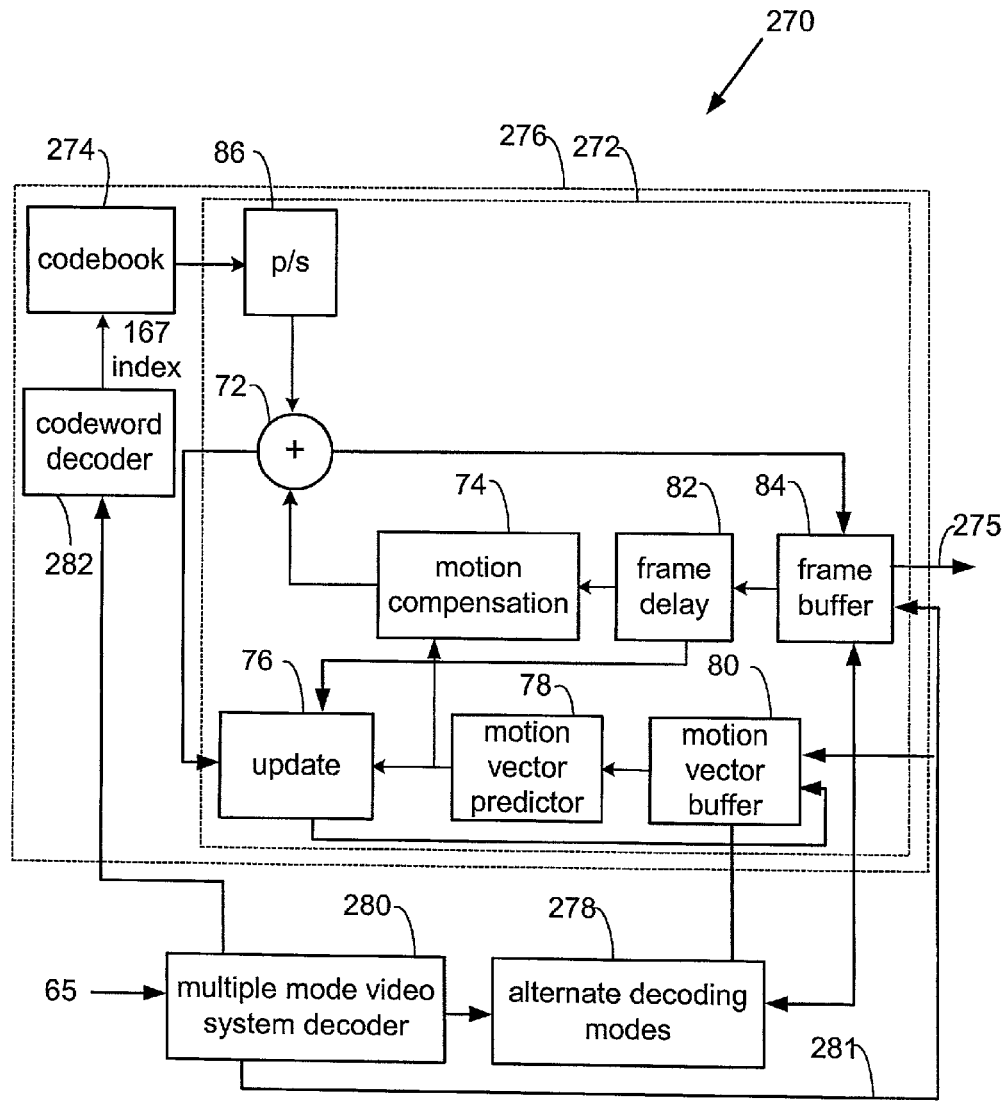
FIG. 5 illustrates a decoder in accordance with one embodiment of the present invention.

A decoder receives compressed bitstream 65. Decoding of a bitstream refers to the process of converting compressed video data to a displayable output. The system that is used to decompress, or decode, compressed digitized video data is called a decoder or decoding apparatus. FIG. 5 illustrates decoder 270 in accordance with one embodiment of the present invention. Decoder 270 is well suited for use in consumer set-tops and the like.

Decoder 270 comprises a codebook-based decoder 276, an alternate decode modes 278 and a system decoder 280. Decoder 270 is a multiple decoding mode system. Alternate video decoding modes 278, such as conventional block based MC/DCT decompression methods as applied in the MPEG standards, are selectively chosen in addition to decompression according to codebook based decoder 276.

The input to multiple decoding mode system 270 is compressed bitstream 65. Embedded in bitstream 65 are codewords for codebook decoder 282, codewords for decoders of other decoding modes and codewords that describe how these modes are coordinated and or how their codewords can be demultiplexed from bitstream 65. The system decoder 280 demultiplexes and routes the codewords to their intended decoders. The reconstructed pixels and motion vectors for all decoding modes are gathered into a frame buffer 84 and a motion vector buffer 80, respectively. Typically, buffers 80 and 84 are addressed by system decoder 280 for the purpose of writing reconstructed data into the buffers. In this manner, all decoding modes may read from buffers 80 and 84 data reconstructed by each individual decoding mode.

Thus, system decoder 280 coordinates the decoders of different modes and allows them to share decoded information. This includes providing address information 281 used to locate data positions inside of frame buffer 84 and motion vector buffer 80 in order to store data from the block currently being decoded. In a specific embodiment, multiple decoding mode system 270 decodes video data only according to codebook decoder 276, and other decoding modes 278 is not needed for the video data.

Codebook based decoder 276 comprises of a decoding unit 272, a codebook 274 and a codeword decoder 282. Codeword decoder 282 receives a codeword being routed from system decoder 280, and decodes the codeword into a error vector index 63.

The codebook 274 converts the code vector indices 63 into error vectors 55 each comprising an array of predetermined motion compensation errors. In this case, codebook 274 comprises the same set of error vectors and error vector indices as used in encoding compressed bitstream 65. In a specific embodiment, codebook 274 is constructed the same as codebook 52 included in the encoders as described with respect to FIGS. 1A and 1C.

The decoding unit 272 receives the error vector 55 from the codebook 274 and reconstructs the uncompressed video block. The decoding unit 272 comprises of a summation unit 72, a motion compensation unit 74, a motion vector update unit 76, a motion vector predictor 78, a frame delay 82, a frame buffer 80 and a parallel to serial converter 86. Since there is no need to produce a block of video data for analysis purpose as in local decoder 54, the serial to parallel converter 88 inside the local decoder 54 is omitted from decoding unit 272. The decoding unit 272 operates substantially the same as the local decoder 54 described with respect to FIG. 1B.

Having briefly discussed encoding, decoding, and codebook construction in accordance with several embodiments of the present invention, embedding of error vector indices into a compressed bitstream will now be expanded upon in accordance with one embodiment of the present invention.

In one embodiment, the present invention uses the system level and picture level system defined MPEG standard to embody the error vecter index. The MPEG-x compression standard consists of two layers: a system layer and an elementary stream layer. The system layer is defined to allow an MPEG decoder to correctly decode audio and video data, and present the decoded result to the video screen in time continuous manner. The elementary stream layer typically contains coded video and audio data. It also defines how compressed video (or audio) data are sampled, transform coded, quantized and represented by different variable length coding (VLC) tables.

Figure 6:
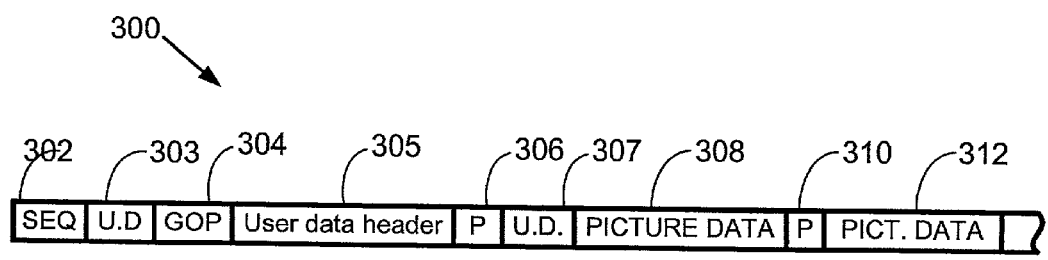
FIG. 6 illustrates the embedding of error vector indices into an MPEG elementary video bitstream in accordance with a specific embodiment of the present invention.

FIG. 6 illustrates the embedding of error vector indices into an MPEG elementary video bitstream 300 in accordance with a specific embodiment of the present invention. The MPEG elementary video bitstream 300 includes a start code indicating processing parameters for the bitstream 300 such as a sequence start code 302, a sequence extension including a user data header 303, a Group of Pictures (GOP) header 304, a user data header 305, a picture header 306, and a picture coding extension that includes a user data extension 307. Picture data 308 follows the picture header 306. The bitstream 300 includes a second picture header 310 preceding picture data 312.

The MPEG standards allow for regions in bitstream 300 to be used for user-defined information. In one embodiment, an error vector index 63 is embedded as a data structure in the private user data header 305. In another embodiment, an error vector index 63 is inserted into the elementary stream in the picture headers 306 and 310 just before the picture data fields 308 and 312. In another embodiment, an error vector index 63 is inserted into the elementary stream in the group of picture headers 304. Addition of error vector indices 63 may be performed by the system encoder 58 of FIG. 1A.

The functions of the fields described above are well-known to one of skill in the art and are described by the MPEG standards. The present invention is suitable for use with the MPEG-1 specification, described in ISO/IEC International Standard 11172; "Coding of moving pictures and associated audio for digital storage media up to about 1.5 Mbits/s", November 1993, which is herein incorporated by reference. The present invention is also suitable for use with the MPEG-2 specification, described in ISO/IEC International Standard 13818; "Generic coding of moving pictures and associated audio information", November 1994, which is herein incorporated by reference. The present invention is also suitable for use with the MPEG-4 specification, described in ISO/IEC International Standard; "Coding of moving pictures and associated audio information", March 2000, which is herein incorporated by reference.

Generally, the techniques of the present invention may be implemented on software and/or hardware. In a specific embodiment of this invention, the techniques of the present invention may be implemented in software such as an operating system or in an application running on an operating system. In one embodiment, the techniques of the present invention are implemented on a general-purpose computer for non real-time encoding. The general-purpose computer includes an encoder that receives an uncompressed video data stream an outputs a compressed data stream including embedded error vector indices.

A software or software/hardware hybrid system of this invention is preferably implemented on a general-purpose programmable machine. Such a programmable machine may be a network device designed to handle network traffic. Such network devices typically have multiple network interfaces. One important class of device that may be used to implement the present invention is the Cable Modem Termination System.

Figure 7:
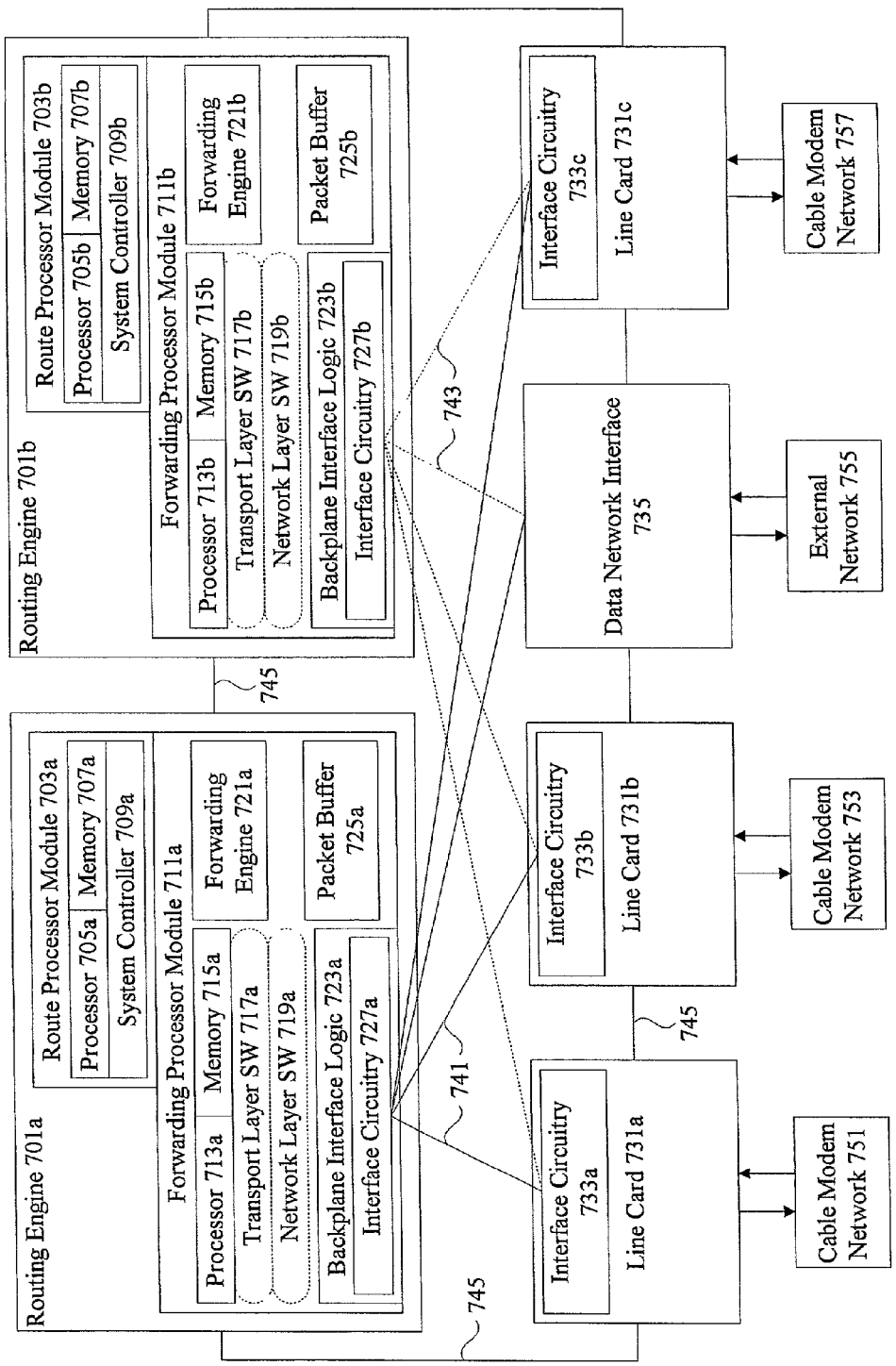
FIG. 7 shows a block diagram of a specific embodiment of a Cable Modem Termination System which may be used to implement certain aspects of the present invention.

FIG. 7 shows a block diagram of a specific embodiment of a Cable Modem Termination System (CMTS) 700 which may be used to implement certain aspects of the present invention. As shown in FIG. 7, the CMTS 700 may comprise a plurality of routing engines (e.g. 701a, 701b).

Each of the routing engines may include a variety of similar modules and/or components. According to a specific embodiment, Routing Engine A may be configured or designed to include a plurality of functionally different modules or components, including, for example, a Forwarding Processor (FP) Module 711a adapted to provide packet forwarding functionality; a Route Processor (RP) Module 703a adapted to implement routing or forwarding operations; a utility component 702a adapted to provide system clock and timestamp functionality; etc. The routing engine components provide may be configured to provide layer one, layer two, layer three and layer four functionality as well as quality of service (QoS) functionality.

According to a specific implementation, the RP Module 703a may be configured as a processor-based routing system comprising functionality incorporated within a typical router, such as, for example, specially configured router models 1600, 2500, 2600, 3600, 4500, 4700, 7200, 7500, 10012, and 12000 available from Cisco Systems, Inc. of San Jose, Calif. For example, as shown in the embodiment of FIG. 7, the RP Module 703a comprises a general-purpose processor 705a (e.g., a MIPS route processor) coupled to a system controller 709a and memory 707a.

The memory 707a may comprise synchronous dynamic random access memory (SDRAM) storage locations addressable by the processor 705a for storing software programs, video data, and data structures accessed by the components. A network routing operating system, portions of which may reside in memory and executed by the route processor, functionally organizes the router by invoking network operations in support of software processes executing on the router.

The RP processor 705a may be configured to construct and load routing tables used by the FP Module 711a. The processor 705a may also be configured or designed to perform configuration management functions of the routing engine 701a, and to communicate with neighboring peer, standby, and/or backup routers to exchange protocol data units used to construct the routing tables in accordance with conventional routing algorithms. It will be apparent to those skilled in the art that other memory types, including various computer readable media, may be used for storing and executing program instructions pertaining to the operation of the routing engine.

Interface circuitry 727a may be coupled to the respective interface circuitry 733a, 733b of line cards 731a, 731b. According to various embodiments, the FP Module 711 may comprise a processor 713a and memory 715a for handling transport layer 717 and network layer 719 functionality. The FP Module 711a may also be configured to provide transaction compacting functionality, data parcel tunneling functionality, video data transmission functionality, etc.

According to different embodiments of the present invention, one or more of the routing engines may be configured to communicate with a plurality of line cards (e.g. 731, 735) via point-to-point links. For example, as shown in FIG. 7, each of the plurality of line cards 731 and 735 are connected to each of the routing engines 701a, 701b via point-to-point links 741 and 743. One advantage of the point-to-point link configuration is that it provides additional reliability in that the failure of one or more line cards will not interfere with communications between other line cards and the routing engine(s). For example, if Line Card A 731a suddenly failed, each of the routing engines would still be able to communicate with the other line cards.

The video processing techniques of the present invention may be implemented on various general purpose Cable Modem Termination Systems. In a specific embodiment, the systems of this invention may be specially configured CMTSs such as, for example, specially configured models in the uBR-7200 and uBR-10012 series of CMTSs available from Cisco Systems, Inc. of San Jose, Calif. In an alternative embodiment, the methods of this invention may be implemented on a general-purpose network host machine such as a personal computer or workstation. Further, the invention may be at least partially implemented on a card (e.g., an interface card) for a network device or a general-purpose computing device.

Regardless of network device's configuration, it may employ one or more memories or memory modules (e.g., memory 707a, 715a, etc.) configured to store video data, program instructions for the network operations and other functions of the present invention described herein. The program instructions may specify an operating system and one or more applications, for example. Such memory or memories may also be configured to store data structures, video data, or other specific non-program information described herein.

Because such information and program instructions may be employed to implement the systems/methods described herein, the present invention relates to machine-readable media that include program instructions, state information, etc. for performing various operations described herein. Examples of machine-readable media include, but are not limited to, magnetic media such as hard disks, floppy disks, and magnetic tape; optical media such as CD-ROM disks; magneto-optical media such as floptical disks; and hardware devices that are specially configured to store and perform program instructions, such as read-only memory devices (ROM) and random access memory (RAM). Examples of program instructions include both machine code, such as produced by a compiler, and files containing higher-level code that may be executed by the computer using an interpreter.

While the discussion to this point has focused on efficient motion compensation techniques for cable networks, the technology of the present invention may be applied to any access or shared-access network having a plurality of hosts or nodes which share at least one channel for communicating with at least one "Head End" in the network. Examples of shared-access networks include, in addition to cable networks, wireless networks, Ethernet, FastEthernet, GigabitEthernet, LANs, etc. In the cable network, the plurality of nodes represents a plurality of cable modems that communicate with at least one CMTS at the centralized termination system using at least one shared-access upstream and downstream channel.

In general, the methods and apparatus described above may be implemented on a traffic handling device (e.g., a switch or router) for providing video processing capability in a network having at least one traffic handling device (e.g., another switch or router) that provides normal service to a host.

For the purposes of the present application a channel is defined broadly as a connection facility to convey digital information from one point to another. A channel includes some or all of the following elements: 1) physical devices that generate and receive the data (e.g., a modulator/demodulator); 2) a medium that carries the data; 3) mathematical schemes used to encode and decode the data; 4) proper communication protocols used to establish, maintain and manage the connection created by the channel; and 5) storage systems used to store the data such as magnetic tapes and optical disks. The concept of a channel includes but is not limited to a physical channel and also includes logical connections established on top of different network protocols, such as xDSL, ATM, IP, wireless, HFC, coaxial cable, Ethernet, Token Ring, etc.

While this invention has been described in terms of several preferred embodiments, there are alterations, permutations, and equivalents which fall within the scope of this invention which have been omitted for brevity's sake.

For example, although encoding color video signals has not been described in detail, encoding color video signals may be performed by the present invention. For the description provided above, a "pixel" refers to a sample in a frame of grayscale video (black/white) or the luma component of color video. However the encoding system described herein may be extended to handle color video by applying the encoding in decoding methods three times, one for each component (red/green/blue) of the color video. It is therefore intended that the scope of the invention should be determined with reference to the appended claims.

What is claimed is:

1. A system for providing video data, the system comprising:
    a decoder apparatus configured to receive a bitstream comprising compressed video data and a residual error vector index, and configured to output the video data in an uncompressed format; and
    a residual error codebook comprising a set of residual error vectors and a residual error vector index associated with each residual error vector, each residual error vector in the set of residual error vectors comprising an array of predetermined motion compensation errors.

2. The system of claim 1 wherein the decoder apparatus performs motion estimation and compensation on a pixel by pixel basis.

3. The system of claim 2 wherein the decoder apparatus performs pel-recursive motion estimation to produce motion vectors for each pixel in a block.

4. The system of claim 3 wherein the decoder apparatus generates reconstructed video data using the motion vectors for each pixel in the block and using the error vector provided by the codebook.

5. The system of claim 1 wherein the array of predetermined motion compensation errors include a predetermined motion compensation error for each pixel in the block.

6. The system of claim 1 further comprising a codeword decoder that decodes a codeword for the residual error vector index.

7. A method for decoding video data, the method comprising:
    receiving a compressed bitstream containing the video data and a residual error vector index;
    converting the residual error vector index to a residual error vector, the residual error vector comprising an array of predetermined motion compensation errors;
    decoding a portion of the video data into an uncompressed format using the residual error vector; and
    outputting the video data in the uncompressed format.

8. The method of claim 7 wherein the residual error vector is selected from a codebook comprising a set of residual error vectors using the residual error vector index.

9. The method of claim 7 further comprising repeating converting the residual error vector index to a residual error vector for each block in a frame of video.

10. The method of claim 7 wherein generating the video data portion includes performing motion estimation on each pixel in a block.

11. The method of claim 10 wherein the motion estimation is pel-recursive motion estimation.

12. The method of claim 7 wherein the portion is a block of pixels.

13. The method of claim 7 further comprising decoding a codeword associated with the residual error vector index from the compressed bitstream.

14. A system for providing a bitstream having compressed video data, the system comprising:

an encoder apparatus that receives uncompressed video data and outputs compressed video data, the encoder apparatus comprising:
- a residual error codebook comprising a set of residual error vectors and a residual error vector index associated with each residual error vector, each residual error vector in the set of residual error vectors comprising an array of predetermined motion compensation errors;
- a local decoder that generates synthesized video data according to a residual error vector provided by the residual error codebook.

15. The system of claim 14 further comprising a system encoder that embeds a selected residual error vector index in the compressed video data.

16. The system of claim 14 wherein the local decoder performs motion estimation and compensation on a pixel by pixel basis.

17. The system of claim 16 wherein the local decoder performs pel-recursive motion estimation to produce motion vectors for each pixel in a block.

18. The system of claim 17 wherein the local decoder generates synthesized video data using the motion vectors for each pixel in the block and using the residual error vector provided by the residual error codebook.

19. The system of claim 14 further comprising a residual error calculator that compares the synthesized video data produced by the local decoder with the uncompressed video data.

20. The system of claim 19 wherein the residual error calculator produces a measure of synthesis error for a block of video data.

21. The system of claim 14 further comprising a cost calculator that produces a synthesis cost based on a general distortion measurement.

22. The system of claim 14 further comprising an index selector that selects an output residual error vector index from the set of residual error vectors included in the residual error codebook based on the cost of synthesized video produced by the local decoder.

23. A method for encoding video data, the method comprising:
(a) generating synthesized video data for a portion of video data using predetermined motion compensation residual errors;
(b) comparing the synthesized video data with raw video data for the portion to generate a synthesis error for the portion; and
selecting a residual error vector index for the portion based on the synthesis error.

24. The method of claim 23 wherein the residual error vector index is selected from a residual error codebook comprising a set of residual error vectors, each residual error vector in the set of residual error vectors comprising an array of predetermined motion compensation errors.

25. The method of claim 24 further comprising repeating (a) and (b) for each residual error vector in the set of residual error vectors.

26. The method of claim 23 wherein generating synthesized video data includes performing motion estimation on each pixel in a block.

27. The method of claim 26 wherein the motion estimation is pel-recursive motion estimation.

28. The method of claim 23 wherein the portion is a block of pixels.

29. The method of claim 28 further comprising partitioning the video data into blocks.

30. The method of claim 28 wherein the block has a rectangular or square shape.

31. The method of claim 23 wherein the encoding is used within a multiple coding mode system.

32. The method of claim 23 further comprising quantifying the synthesis error for the portion.

33. The method of claim 23 further comprising embedding the residual error vector index into a compressed bitstream.

34. A method for constructing a residual error codebook, the residual error codebook comprising a set of residual error vectors and a residual error vector index associated with each residual error vector, each residual error vector in the set of residual error vectors comprising an array of predetermined motion compensation errors, the method comprising:
(a) generating a cluster center for each residual error vector in the residual error codebook;
(b) receiving a set of motion compensation error blocks;
(c) assigning each of the motion compensation error blocks to a cluster;
(d) updating the cluster center for residual each error vector in the residual error codebook to form a new cluster center for each residual error vector in the residual error codebook; and
(e) designating the new cluster center for each residual error vector in the residual error codebook as the array of predetermined motion compensation errors for each residual error vector in the residual error codebook.

35. The method of claim 34 wherein assigning each of the motion compensation error blocks to a cluster comprises determining a quantitative difference between a block of motion compensation errors and a cluster center.

36. The method of claim 34 wherein the cluster centers are generated randomly.

37. The method of claim 34 further including repeating (c) and (d).

38. A system for providing video data, the system comprising:
means for receiving a compressed bitstream containing the video data and a residual error vector index;
means for converting the error vector index to an error vector, the residual error vector comprising an array of predetermined motion compensation errors;
means for decoding a portion of the video data into an uncompressed format using the residual error vector; and
means for outputting the video data in the uncompressed format.

39. A system for encoding video data, the system comprising:
means for generating synthesized video data for a portion of video data using predetermined motion compensation errors;
means for comparing the synthesized video data with raw video data for the portion to generate a synthesis error for the portion; and
means for selecting a residual error vector index for the portion based on the synthesis error.

* * * * *